United States Patent [19]

Tamura et al.

[11] 4,248,625

[45] Feb. 3, 1981

[54] METHOD OF OPERATING A BLAST FURNACE

[75] Inventors: Sakae Tamura; Kyoji Okabe; Tsuyoshi Fukutake, all of Chiba; Seiji Taguchi, Yotsukaidomachi; Tamotsu Nagai, Chiba; Mitsuo Saino, Chiba; Tadaaki Iwamura, Ichihara, all of Japan

[73] Assignee: Kawasaki Steel Corporation, Hyogo, Japan

[21] Appl. No.: 63,969

[22] Filed: Aug. 6, 1979

Related U.S. Application Data

[63] Continuation-in-part of Ser. No. 845,400, Oct. 25, 1977, abandoned.

[51] Int. Cl.$^3$ ............................................. C21B 5/00
[52] U.S. Cl. ........................................ 75/41; 266/44; 266/80; 266/99
[58] Field of Search ................. 75/41, 42; 266/44, 47, 266/78, 80, 88, 89, 99

[56] References Cited

U.S. PATENT DOCUMENTS

| | | | |
|---|---|---|---|
| 3,304,171 | 2/1967 | McCleskey | 266/44 |
| 3,690,632 | 4/1972 | Munson | 266/80 |

FOREIGN PATENT DOCUMENTS

751721  11/1970  Belgium ..................................... 266/44

Primary Examiner—Paul A. Bell
Attorney, Agent, or Firm—Koda and Androlia

[57] ABSTRACT

A method of operating a blast furnace comprising the steps of selecting eight factors mathematically and statistically as effective in determining the operating condition of a blast furnace, sensing the eight factors as sample data, converting the sample data into variable factors, comparing the sample data and the variable factors with predetermined limiting factors, generating numerical non-dimension values corresponding to the level of satisfaction between the sample date or variable factors and the corresponding limiting values, multiplying the numerical non-dimensional values by predetermined corresponding weight allocation indices, summing separately the results of the multiplication for the sample data and the variable factors to form a numerical factor grand addition output and a variable factors grand addition output, summing the numerical factors grand addition output and the variable factors grand addition output to form an overall grand addition output and taking appropriate action to control the furnace based upon the values of the overall grand addition output, numerical factors and variable factors grand addition outputs and the numerical non-dimensional values.

5 Claims, 8 Drawing Figures

| Lapse of time | | 4 hr | 3 hr | 2 hr | 1 hr | 0 present | | | | |
|---|---|---|---|---|---|---|---|---|---|---|
| Judgement of absolute values | DP | △ | △ | ○ | ○ | ○ | ○ | ○ | ○ | ○ |
| | SHP | △ | △ | ○ | ○ | ○ | △ | △ | ○ | ○ |
| | ECO | ○ | △ | △ | ○ | ○ | ○ | × | ○ | ○ |
| | TGH | ○ | ○ | ○ | △ | ○ | ○ | × | ○ | ○ |
| | HL | ○ | ○ | ○ | ○ | ○ | ○ | ○ | ○ | ○ |
| | PSB | ○ | ○ | ○ | ○ | ○ | ○ | ○ | ○ | ○ |
| | SHT | ○ | ○ | ○ | ○ | ○ | △ | △ | △ | ○ |
| | SH | △ | △ | × | × | × | × | × | ○ | ○ |
| Judgement of variations | DPv | △ | △ | △ | △ | △ | △ | △ | △ | ○ |
| | SHPv | △ | △ | △ | △ | × | × | × | × | × |
| | ECOv | × | × | × | × | × | × | × | × | × |
| | TGHv | △ | △ | △ | △ | ○ | △ | △ | △ | △ |
| | HLv | ○ | ○ | ○ | ○ | ○ | ○ | ○ | ○ | ○ |
| | PSBv | △ | △ | △ | △ | △ | △ | ○ | ○ | ○ |
| | SHTv | ○ | ○ | ○ | ○ | △ | △ | △ | △ | △ |
| | SHv | △ | △ | × | × | × | × | × | × | ○ |
| G.S. number | | 50 | 45 | 58 | 57 | 61 | 54 | 31 | 62 | 64 76 |

GO-STOP Judgement (GO)

*FIG. 6*

METHOD OF OPERATING A BLAST FURNACE

This is a continuation-in-part of application Ser. No. 845,400, filed Oct. 25, 1977, now abandoned.

BACKGROUND OF THE INVENTION

1. Field of Invention

This invention relates to methods of making steel and more particularly methods of operating a blast furnace.

2. Prior Art

In a blast furnace, counter current reactions are conducted between the mixture of solids, liquids and gasses contained in the blast furnace, the mixture descending from top to bottom and the gases ascending from bottom to top. Therefore, in order to favorably operate the blast furnace, it is necessary to keep the physical and chemical conditions of the gases, solids and liquids (hereinafter referred to as the furnace condition) stable in some desirable manner. Included in the disturbing factors governing the furnace condition are many factors such as the properties of the charge covering the reducability, strength, noncollapsability, chemical components, grain size, and the flow rate of the hot air, temperature of the hot air, temperature of the deposits on the refractory wall of the furnace, damage to the blast furnace cooling system, in-furnace storage level of molten materials such as molten metal and molten slag and the like.

Blast furnace operators constantly observe the changes in the disturbing factors to timely control the or/coke, flow rate of hot air, temperature of hot air and other controllable factors to appropriate values thereby enabling them to keep furnace conditions stable.

However, even if variations of the variable factors are observed, it is difficult to effect an optimum control of the controllable factors to keep the furnace condition stable. This is a result of: (1) variations in the disturbing factors in most cases is unpredicatble, (2) the magnitude of the variations can be only quantatitively observed and (3) the influence of the variations on the furnace condition is complicated by the influence of other disturbing factors thereon. For these reasons, there has been practiced such a furnace control method in general that the blast furnace operators observe the changes in the disturbing factors and at the same time observe the changes in the furnace condition resulting from the disturbing factors and the furnace conditions indicative factors indicating the current furnace condition so as to effect the fine adjustment on these controllable factors to thereby try to bring the changes of the furnace condition indicative factors to a better condition. On the other hand, there are many furnace control indicative factors and the changes of the individual factors are complicated by one another as a result of variations in relative lag time due to the patterns of the furnace condition. Hence, it has been difficult for the blast furnace operators to determine the pattern of furnace conditions based on their observance of the furnace condition indicative factors. For this reason, a standard method of grasping the furnace condition has been determined by a series of technical knowhow and the blast furnace operators have been determining the furnace condition based on their understanding of the standardized reference. Although the flow of thought in which the reference is standardized has been defined, the abilities and experience of the individual operators of the blast furnace is reflected in the results of their judgement on the furnace condition and there has been generally such a difference in skill in grasping the furnace condition from person to person since there are so many furnace condition factors and the types of changes are very complicated.

SUMMARY OF THE INVENTION

Accordingly it is a general object of the present invention to provide a solution for the problems described above.

The phenomenon occurring in a blast furnace is a physical and chemical counter-current reaction between gasses and a layer of a mixture of a solid and a liquid. As a result of theoretical and statistical analysis with attention directed to the below described five items, it has been found that a smaller number of factors can be selected from the many furnace condition indicative factors which depend upon the operational characterics of the furnace to control the operation of the furnace and to determine a control method and action values for operating the furnace.

The essence of the stabilization in the blast furnace condition resides in that:

(1) The rate between the dynamic lift which the charge descending into the furnace receives from the ascending gasses and the weight of the charge is maintained within the limit of that dynamic lift, the weight of the charge can be balanced at every portion in the furnace.

(2) Local irregularities of the materials in amount from place to place and the stagnation of the materials in circulation in the blast furnace are to be avoided.

(3) Heat distribution in cross-section and vertically in the furnace should be maintained properly.

(4) Molten material on the hearth should be discharged as soon as possible and should not be allowed to remain behind.

(5) The fluidities of the molten material should be kept at a satisfactory level.

In order to judge the furnace condition, it is necessary to control the factors (1) to (5). However, in fact, there is no measuring means for directly measuring the phenomenons (1) to (4) described above. Therefore, the operators must indirectly judge the furnace condition with regard to items (1) to (4), respectively, from one or a plurality of measured values having a close relationship to the items (1) to (4) and which are directly measureable.

Therefore, if factors each having the highest contribution ratio to the items (1) to (5) in a blast furnace A are determined by mathematical and statisticl methods, such results may be obtained that, for the item (1) it is an indicative index of the total pressure loss in the furnace (hereinafter referred to as "total pressure drop" or "DP"); for the item (2) an indicative index of the pressure distribution at the shaft (hereinafter referred to as "pressure drop between shaft and furnace top" or "SHP"); for the item (3) an indicative index of temperature distribution on the shaft wall (hereinafter referred to as "shaft wall temperature" or "AHT"); for the item (4) an indicative index of molten material remaining in the furnace (hereinafter referred to as "input and output balance of iron and slag" or "PSB"); and for the item (5), an indicative index of heat level in the furnace (hereinafter referred to as "thermal state in furance" or "HL"). The blast furnace condition can be controlled with a reliability of 88.9 percent by control of the above factors. However, with regard to the items (1) to (3), the reliability in the control of the furnace condition is further raised to 96.4 percent by adding three more factors thereto. These factors include: (6) an indicative index of the state of the charge descending (hereinafter referred to as "burden descent" or "SH"); (7) an indicative index of the rate of gas utilization (hereinafter referred to as "top gas utilization" or "ECO"); and (8) an indicative index of the temperature distribution of the gas at the furnace top (hereinafter referred to as "top gas temperature" or "TGT").

Additionally, if more factors are added, there is little raise in the reliability of the control of the furnace condition as compared with the number of increased factors. As it has been described above, it has been found that control of the furnace condition can be had through control of at least the five factors relating to the items (1) to (5), and furthermore, it is best to control the above described eight factors from the viewpoint of increased reliability and quicker judgement.

Outline of the control method of the blast furnace A will hereunder be given with reference to the above described eight indices indicative of the furnace condition.

Firstly, the above described eight factors are sensed and turned into numerical values. The eight factors are then classified by stages of satisfaction depending upon the characteristics as viewed as level and numerical variations thereof and the respective eight factors are accorded a ranking of satisfaction of respective eight factors are multiplied by weight allocations whereby the overall judgement indice for the furnace condition can be computed.

The overall judgement indices consist of a judgement based on the levels of the numerical values of the furnace condition indicative indices and on variations in the numerical values of the furnace condition indicative indices. The judgement based on levels is conducted such that limiting values are determined for the levels of numerical values of the indicative indices, respectively, and the rankings of satisfaction is determined by a comparison between the limiting values and the measured numerical values. These limiting factors are determined based upon statistical analysis and comprise statistically optimal values for each of the eight factors based upon an optimally operating blast furnace.

Next, comparisons are made between the respective numerical factors sensed and the limiting values determined for each of the respective factors. As a result, the factors are classified by levels. In order to deduce the over all judgement from these factors, it is necessary to learn in advance what levels the above described factors belong to, respectively, in the overall judgement evaluation. For this purpose, a weight allocation is made to each factor. The weight allocation is again determined statistically based upon experience with blast furnaces.

In addition to the above described eight factors (hereinafter referred to as "numerical factors"), there are eight variable factors corresponding to the eight factors, respectively. A weight allocation is made to each of these eight variable factors and the value of the weight allocation for each of the eight variable factors is again determined statistically based upon past experience with blast furnaces.

Actually, the overall evaluation is made in such a manner that two overall evaluations are considered together. In other words, a first overall evaluation is made on the eight numerical factors and the resultant numerical factors respectively given the weight allocations corresponding to each of the eight numerical factors and a second overall evaluation is made on the eight variable factors and the resultant variable factors respectively given their weight allocation corresponding to said eight variable factors.

In addition to the overall evaluation, evaluations of the furnace condition are made based upon evaluation of each of the respective factors. However, this does not mean that the evaluation is made merely on the factors in a separated manner, but in a manner in addition to the overall evaluation. Namely, it is possible to make accurate evaluation of the furnace condition from the overall evaluation and an evaluation of the relationship between the respective eight factors.

In determining the variable factors, curve interpolation of the values of the eight numerical factors with time is used. As a result, the variation in the value of each of the respective factors can be obtained. Respective variable factors can be computed from the changes in the value of the respective factors. In order to determine the variable factors, a statistical method can be utilized.

Although there are many methods of indicating the condition of the blast furnace, the optimum example for an indicating method is a "spider-web"; i.e., a tabulation expressed as a circle and cross. A CRT (cathode ray tube) display apparatus is presently used for a "spider-web" type display.

Thus, the furnace condition can be indicated on the "spider-web" display and three types of operational instructions are given to the furnace operators. These three types of operational instructions are "GO," "STOP" and "BACK." Additionally, emergency instructions are issued in case any of the individual factors deteriorates to a great extent. Based upon the operational instructions "GO," "STOP" and "BACK" a change in blast volume, a change in ore/coke ratio or an increase in the tapping operation is affected. The type of action to be taken in response to each operational instruction is predetermined depending upon the judgement of the furnace condition and the states of each of the eight factors in time sequence.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 6 is a table illustrating a judgement for each of the numerical values and each of the variable values together with the overall judgement with time.

DETAILED OF THE INVENTION

Figure 1:
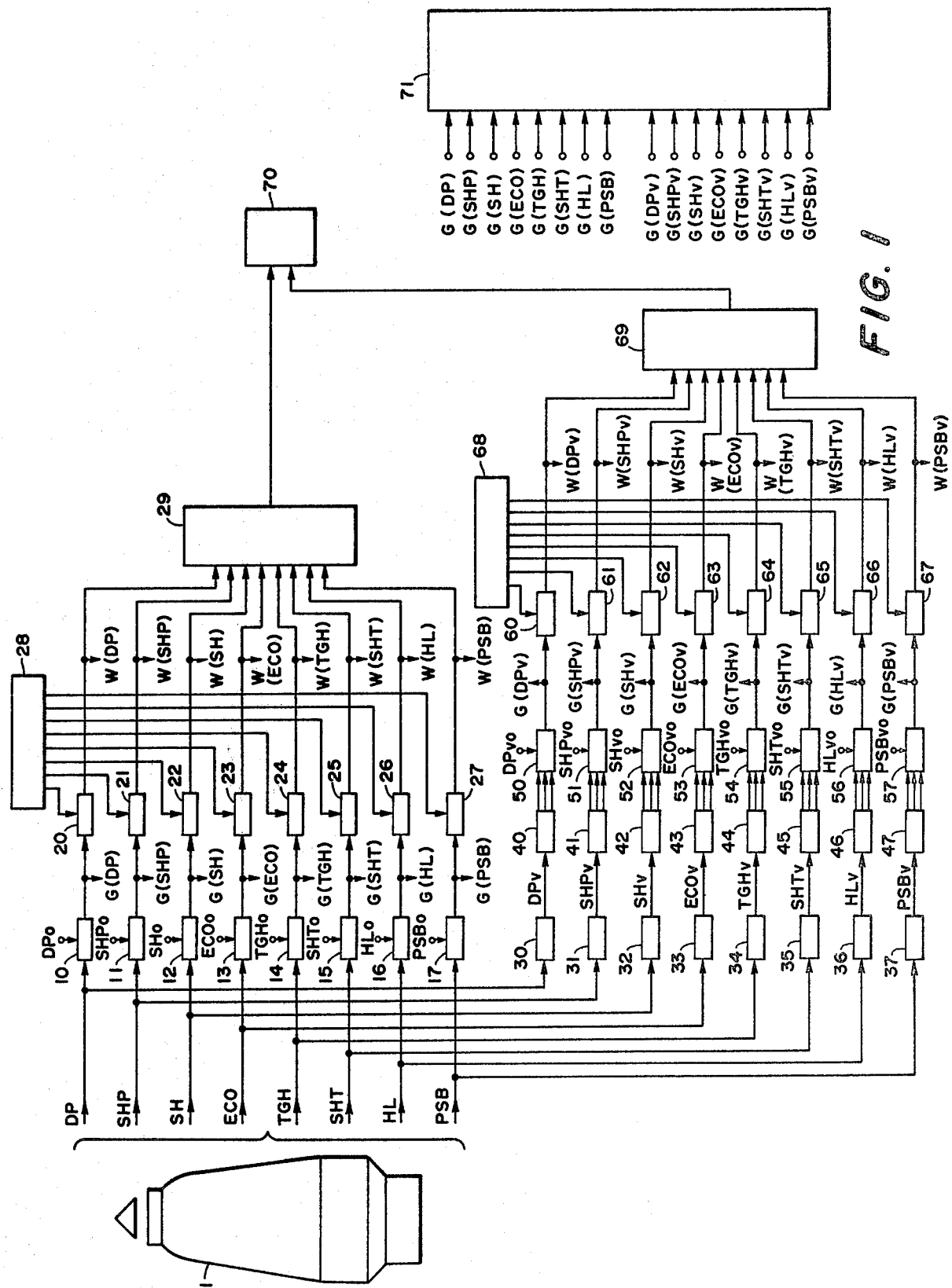
FIG. 1 illustrates one embodiment of a method of operating a blast furnace in accordance with the teachings of the present invention.

Referring more particularly to the drawings, shown in FIG. 1 is one embodiment realizing the method of the present inention. In FIG. 1, the factors DP, SHP, SH, ECO, TGH, SHT, HL and PSB are detected in the blast furnace 1 utilizing various methods and sensors which exist in the prior art. The detection of these factors may be made continuously. However, continuous detection is not required to judge the furnace condition. The reason that the detection need not be continuous is that reliable data as to changes in the furnace condition can be had even if the factors are detected every few minutes or hours. Referring to Table 1 shown is a typical example of the sampling time and judgement time periods for conducting judgement for each of the respective factors. The data in Table 1 is based on actual experimental results.

TABLE 1

| Name of Factor | Sampling time | Judgement time period |
|---|---|---|
| DP | 1 min. | 30 min. |
| TGT | 1 min. | " |
| ECO | 1 min. | " |
| SH | 10 min. | " |
| SHP | 5 min. | " |
| SHT | 30 min. | " |
| PSB | Tapping Time | " |
| HL | Tapping Time | " |

The factors which are detected and sampled at predetermined intervals of time are supplied to comparing circuits 10, 11, 12, 13, 14, 15, 16 and 17 and are also supplied to function generators 30, 31, 32, 33, 34, 35, 36 and 37. In FIG. 1, that portion of the circuit shown in the upper portion of the drawing is a circuit for processing the numerical factors while that portion of the circuit shown in the lower portion is for processing the variable factors.

Firstly, description will hereunder be given for that portion of the circuit for processing the numerical factors. In the comparing compounds 10, 11, 12, 13, 14, 15, 16 and 17, comparison is made between a predetermined limiting value for each of the factors. The limiting values for each of the factors DP, SHP, SH, ECO, TGH, SHT, HL and SPB are respectively $DP_0$, $SHP_0$, $SH_0$, $EC_0$, $TGH_0$, $SHT_0$, $HL_0$ and $PSB_0$. Each of these limiting values is determined via statistical analysis based upon actual experience and are mathematically determined statistically from the operation of a blast furnace and desired furnace condition.

In each one of the comparing circuits 10–17, the factors are compared with the limiting values and the comparison is classified into a plurality of levels. For example, the comparison could be divided into three levels such as "good," "worse" and "bad." When a comparison is made, one of the three levels is supplied as an output from the comparing circuits 10–17 depending on the level of satisfaction. Preferably, this output should be as numerical value. For example, "good" could be made to correspond to the numerical value "2," "worse" to "1" and "bad" to "0." However, any other numerical value system may be adopted.

The output signal from each of the comparing circuits 10–17 are the signals G(DP), G(SHP), G(SH), G(ECO), G(TPH), G(SHT), G(HL) and G(PSB). These output signals from the comparing circuits 10–17 are then supplied to the multiplying circuits 20, 21, 22, 23 24, 25 and 27. Weight allocation indices corresponding to each of the factors, respectively, are supplied from a weight allocation index generator 28 to each of the multiplying circuits 20–27 and the output signal from each of the comparing circuits 10–17 is multiplied by the respective weight allocation index. It should be apparent that each of the multiplying circuits could be a well known digital multiplying circuit of the type which exists in the prior art. The weight allocation indices are initially preset in the weight allocation generator 28 and are initially determined mathematically from past experience and blast furnace operation. In addition, the weight allocation indices are initially preset so as to determine the overall evaluation or judgement. Also, each of the weight allocation indices are affected by the condition and operation of the blast furnace 1 which is being controlled and the weight allocation indices may each be varied during the operation of the blast furnace 1 by manually changing the initial preset value in the weight allocation index generator 28.

In the respective multiplying circuits 20–27, the output of the comparators circuits 10–17 are each multiplied by the respective weight allocation indices and the output of each of the multiplying circuits 20–27 is W(DP), W(SHP), W(SH), W(ECO), W(TGH), W(SHT), W(HL), W(PSB). Each of the outputs from the multiplying circuits 20–27 are supplied to the grand adding circuit 29.

In the grand adding circuit 29, grand addition of each of the outputs from the multiplying circuits 20–27 is carried out. In other words, the outputs from the multiplying circuits are summed together. It should be apparent that in practice the grand addition circuit 29 may be an arithmetic unit for performing summation or a special purpose hard wire summation circuit which consists of serial adders, both of which exist in the prior art. The result of the grand addition or summation of the outputs from the multiplying circuits 20–27 is a numerical value indicating an overall evaluation of the numerical factors.

Next, a description will be given of that portion of the circuit for processing the variable factors. The factors DPS, SHP, SH, ECO, TGH, SHT, HL and PSB are each supplied respectively to function generators 30–37. Since as shown in Table 1 the factors may be sampled discontinuously in terms of time, the timewise discontinuity must be eliminated. For this reason, a function generator 30–37 is provided for each of the factors. Specifically the function generators 30–37 carry out a curve interpolation (smoothing) function based on the numerical values discontinually supplied to the function generators 30–37. An example of this operation is given in conjunction with FIG 2.

Figure 2A:
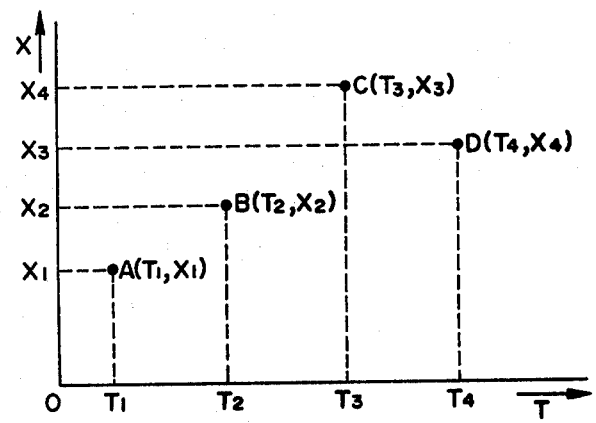
FIGS. 2a and 2b and 3 are views illustrating how the variable factors are determined.
Figure 2B:
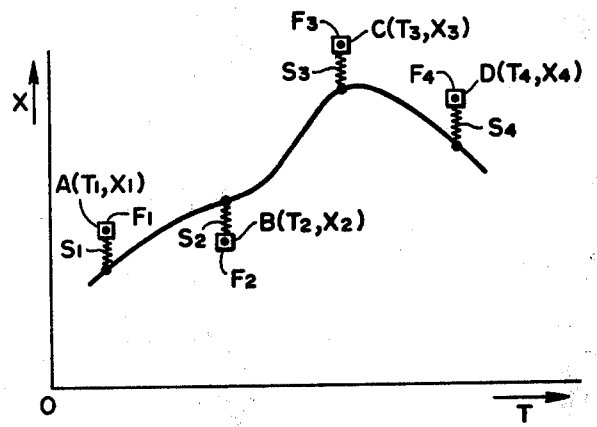

In both FIGS. 2a and 2b, time is given as an abscissa and the factor x is given as an ordinate. It is assumed that, in FIG. 2a, factors $x_1$, $x_2$, $x_3$ and $x_4$ are each detected at times $T_1$, $T_2$, $T_3$ and $T_4$ at the positions A, B, C and D as shown. The aim of the function generators 30–37 is to produce a continuous signal which passes through the point A, B, C and D. FIG. 2b shows such an example wherein fixed shafts $F_1$, $F_2$, $F_3$ and $F_4$ referenced from the points A, B, C and D respectively, are conceived and springs $S_1$, $S_2$, $S_3$ and $S_4$ are fixed at one end thereof on said fixed shaft $S_1$ through $S_4$ and connected to the other end thereof to an elastic line. Hereat, the curve shown by the elastic line with flexural rigidity of the elastic line and spring constant of the springs balanced relative to each other is regarded as the best smooth curve passing through the points A, B, C and D (literature "Data Process," 1969, volume 10, No. 3, pages 120, etc.). Under the method described above, the function generators 30–37 generate continuous functions based on the factors sampled. The values obtained for the function generators are continuous numerical factors, and hence, are referred to as variable factors $DP_V$, $SH_V$, $SHP_V$, $ECO_V$, $TGH_V$, $SHT_V$, $HL_V$, and $PSB_V$. These variable factors are then supplied from the function generators to the variable factor detecting circuits 40, 41, 42, 43, 44, 45, 46 and 47.

Description will hereunder be given of a specific example of that portion of the circuit shown in FIG. 1 which processes the variable factors. However, prior to this description, the basic concept of how the variable factors are derived will be described.

The condition where the furnace condition indicative factor x (x representing any of the factors sensed) is kept at an adequate level is called a good furnace condition. In this condition, the variations should be kept at a minimum also. There are three types of variations in the value of the indicative factor x. These variations are called the large wave, medium wave, and small wave. These waves are caused from various factors in the blast furnace condition. Accordingly, the blast furnace operators must maintain all of the large, medium and small waves in an adequate condition. To be specific, cyclic times in the variation of the large, medium and small waves vary depending on the type of the furnace condition indicative factor. In other words, each of the furnace condition indicative factors has a different frequency for each of its large, medium and small waves and the frequency for each of its large, medium and small waves and the frequency of each of the factors can be determined mathematically by observing the operation of a blast furnace. For example, for the case of the index of top gas utilization (ECO), the period of the small wave is five to ten minutes, the period of the medium wave is one to two hours and the period of the large wave is four to eight hours.

In order to quantitatively grasp the small, medium and large waves, small, medium and large variable factors must be determined which correspond to the small, medium and large waves. These variable factors for the small, medium and large waves will hereunder be qualitatively determined with reference to the index of top gas utilization (ECO).

Small variable factor $\sigma_S$ is obtained from the condition of the small wave. A plurality of data at various times is required for determining the small wave and the frequency for taking the data is once every minute when the period of the small wave is five minutes. The sampling frequency for the small wave is dependent upon the period of the small wave and can be selected based upon sampling theory. The results of the detection of the small variable factors $\sigma_S$ from such sample data are represented as dispersed points of data actually sent and a smooth continuous curve can be obtained mathematically from the data.

Medium variable factor $\sigma_M$ is obtained from the condition of the medium wave. This medium variable factor $\sigma_M$ can be detected in somewhat the same manner as the small wave factor and can also be determined as an undulation of the smooth continuous curve determined from the sample data of the small wave. Accordingly, the medium variable factor $\sigma_M$ can be determined from the inclination of the undulation of the curve (dx/dT). To be specific, the magnitude of inclination in the section being detected is represented in the amount of deviation.

Large variable factor $\sigma_L$ is detected from the large wave. The large wave can again be determined in the same way as the small wave variable factors and has a period of four to eight hours. In addition, the large variable factor $\sigma_L$ can be represented as a deviation from the mean value ($\overline{X}_L$) of the value determined from the smooth continuous curve of the small wave.

Next, a detailed description of the interrelations between the variations and the furnace conditions. For example, in the furnace condition where gasses in the furnace has a flow-by trend and are exhausted from the top of the furnace without fully affecting the reduction, the following phenomenon is seen:

(1) A lowered level of the indicative index of total pressure drop (DB), a considerable increase in the small wave and an increase in the medium wave;

(2) A lowered level of the indicative index of top gas utilization (ECO), a considerable increase in the small wave and an increase in the median wave;

(3) A raised level of the indicative index of top gas temperature (TGT) and an increase in the medium wave.

Since the small, medium and large waves of the indicative factors show different characteristics, respectively, depending on the furnace conditions as described above, the small, medium and large waves are required to be determined separately of one another.

The simplest method for determining the variable factors is to determine the inclination of the above described continuous curve and derive the variable factors from the inclinations thus obtained. Or, a specific section of the curve may be indicated and the resultant value is the variable factor. Or, the respective factors may be supplied to variable factor detecting circuits as dispersed values against the continuous curve.

Figure 3:
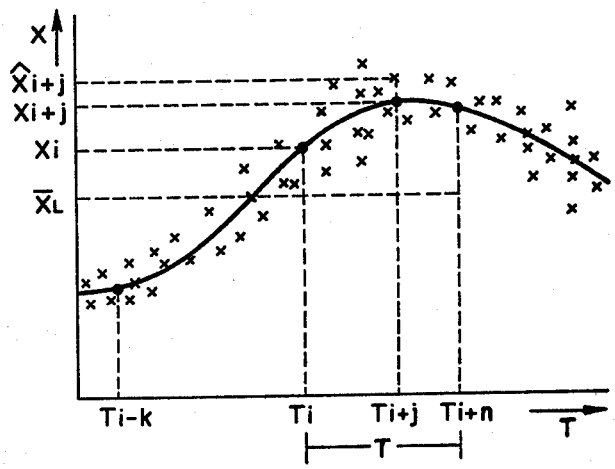

FIG. 3 is a view explaining the computation of the variable factors. In FIG. 3, indicated at x's are the values of numerical factors sampled at regular intervals of time. In order to determine the variable factors from the variously dispersed values shown in FIG. 3, it is necessary to determine the variable factors in a specific period of time, Ti T Ti+n. For example, the variable factors determined include the small, medium and large variable factors described above. Now, it is assumed that the value of the continuous curve at the time Ti+j (where j=1−n) is Xi+j and the dispersed value at that time is $\overline{X}i+j$. Then, the small variable factor $\sigma_S$ is given by the following formula:

$$\sigma_S = \sqrt{\frac{\sum_{j=1}^{n} -(\hat{X}i + j - \hat{X}i + j)^2}{n}} \quad (1)$$

The medium variable factor $\sigma_M$ is given by the formula:

$$\sigma_M = \sqrt{\frac{\sum_{j=1}^{n} \left(\left|\frac{dx_i}{dT}\right| - \left|\frac{dx_i + j}{dT}\right|\right)^2}{n}} \quad (2)$$

And the large variable factor $\sigma_L$ is given by the formula:

$$\sigma_L = \sqrt{\frac{\sum_{j=1}^{n} (x_i + j - \overline{x}_i)^2}{n}} \quad (3)$$

In the above formula n is a total number of sample data in the section $T_i < T < T_i+n$; $|dxi/dT|$ is the arithmetical mean value of the magnitude of the inclination (absolute value) of the continuous curve sought at the regular intervals of time T/n during the period of time $T_i-k$ to $T_i+n$; $\overline{X}_L$ is the arithmetical mean value of the continuous curve sought at regular intervals of time T/n during the period of time $T_i-k$ to $T_i+n$; and $k = m \cdot n$ (m is a positive integer), i.e., $T_i+n-T_i-k = m \cdot T$.

Thus, small variable factors $\sigma_S$, medium variable factors $\sigma_M$ and large variable factors $\sigma_L$ can be obtained from the respective factors. The variable factor detecting circuits shown in FIG. 1 cary out the above described calculations. The variable factor detecting circuits 40-47 receive the data from the function generating circuits 30-37 and determine arithmetically the small, medium and large variable factors. In practice, it should be apparent that these variable factor detecting circuits 40-47 can be made from prior art circuits and in particular may be a computer arithmetic unit or a special purpose arithmetic unit hardwired to perform the desired calculations and generate the desired data for each of the small, medium and large variable factors.

The outputs from the respective variable factor detecting circuits are supplied to comparing circuits 50, 51, 52, 53, 54, 55, 56 and 57. The comparing circuits 50-57 are supplied with limiting values for each of the respective variable factors. The limiting values are again determined statistically from the operation of a blast furnace. The limiting values for the respective variable factors are DPhd vo, $SHP_{vo}$, $SH_{vo}$, $ECO_{vo}$, $TGH_{vo}$, $HST_{vo}$, $HL_{vo}$ and $PSB_{vo}$. There are three limiting values for each of the variable factors, i.e., a limiting value for the small variable factors, a limiting value for each of the medium variable factors and a limiting value for each of the large variable factors. One or a plurality of limiting values for each of the three types are given at several states. That is, in order to classify the factors into n stages and number, at least n−1 limiting values in number are required. In the drawing, for simplifications sake, only one limiting value is shown.

The outputs from the variable factor detecting circuits are supplied to the comparison circuits 50-57 and a comparison is made between the three variable factors and the three limiting values corresponding thereto. There are two ways of processing the results of the results of the comparisons. According to the first way, the three variable factors can be classified into levels, respectively, and corresponding numerical values can be produced as outputs as a result of the classifications. In this case, for example, numerical values "2," "1" and "0" are made to correspond to three levels. The three levels are called "good," "worse" and "bad," respectively. According to the second way, an overall evaluation for the variable factor is given from the results of the comparison between three types of variable factors with the respective variable factors. To give the overall evaluation from the results of the comparison between three variable factors, there are several methods. All of these methods are based on a method wherein the condition of the variation is determined from the proportions of the small and large variations. The result of this overall evaluation becomes the classification of levels. In the drawings is shown an example of the later wherein an output is produced for each of the variable factors.

The outputs of the respective comparing circuits 50-51, i.e., G(DPv), G(SHPv), G($SH_V$), G($ECO_V$), G($TGH_V$), G($SHT_V$), G($HL_V$) and G($PSB_V$), are supplied to the multiplying circuits 60, 61, 62, 63, 64, 65, 66 and 67. The respective multiplying circuits remember the weight allocation indices supplied by the weight allocation generator 68 for each of the respective variable factors and then multiplies the appropriate weight allocation index times the respective output from the comparing circuits. The weight allocation indices from the weight allocation index generator are preset and predetermined by taking into account the furnace condition and the operation of the furnace. To preset the weight allocation indices, it is necessary to take into the account the extent of the influences given to the overall evaluations of the variable factors. While the initial weight allocation indices may be determined from the furnace conditions, the weight allocation indices may be changed manually during the course of the operation of the furnace.

Thus, the respective multiplying circuits 60-67 carry out the multiplication of the outputs from the comparing circuits 50-57 by the weight allocation indices corresponding to the required variable factor. The results of the multiplication are supplied to the grand adding circuit 69 wherein a grand addition of all of the results of the multiplication is carried out; in otherwords a summation of the outputs of the multiplying circuits 60-67 is done by the grand addition circuit 69. It should be apparent that the grand adding circuit 69 may be the arithmetic unit of a computer, a special purpose arithmetic unit which is hardwire programmed or specially constructed from the prior art adding circuits such as serial adders. The result of the grand addition by the grand adding circuit 69 represents the overall evaluation of the variable factors. In addition, outputs from the respective multiplying circuits 60-67 for each of the respective variable factors are $W(DP_v)$, $W(SHP_v)$, $W(SH_v)$, $W(ECO_v)$, $W(TGH_v)$, $W(SHT_v)$, $W(HL_v)$ and $W(PSB_v)$.

An output from the grand adding circuit 29 which is the overall evaluation of the numerical factors and an output from the grand adding circuit 69 which is the overall evaluation of the variable factors are supplied to the grand judging circuit 70 which receives the outputs from both of the grand adding circuits 29 and 69 so as to conduct an overall evaluation of the furnace condition. The simplest way of conducting the overall evaluation is to simply add the value of the overall evaluation for the numerical factors from the grand adding circuit 29 to the value of the overall evaluation for the variable factors from the grand adding circuit 69. In order to realize this function, an adding circuit can be utilized as the grand judging circuit 70. The value of the output of the grand adding circuit is utilized to supply operating instructions to the operators. In other words, if the output of the grand adding circuit 70 is greater than some first predetermined value, a "Go" indication is given. If the output of adding circuit 70 is less than the first predetermined value, a "Stop" indication is given. If the output of adding circuit 70 is less than the second predetermined value, a "Back" indication is given. The operator then takes the appropriate action for each of the indications "Go," "Stop" and "Back."

When a "spider-web" indication or a trend indication is given, the operators of the blast furnace take action in accordance with the following procedure:

(1) A "Go" is indicated, leave the operating conditions unchanged;

(2) A "Stop" indication is given, try to determine the cause or causes of the deterioration and choose one of the following three actions:

(a) decrease the wind flow by three percent if the "Stop" indication has been in existence for more than three hours;

(b) lower the ore/coke ratio if the numerical value evaluation of HL by levels is a "0;"

(c) strengthen the tapping operation when the evaluation of the numerical value of PSB by levels is a "1" or a "0."

(3) A "Back" indication is given, decrease the blast volume by five percent and try to find the band condition or conditions and choose one of the following three actions:

(a) lower the ore/coke ratio if the evaluation of HL by levels a "1" or "0;"

(b) continuously carry out the tapping operation when the evaluation of PSB by levels is a "1" or "0;"

(c) decrease the blast volume by five percent again when the evaluation by levels of DP or SHP is lowered to a "0."

In the above example, only the actions intended for safety have been described. However, in the case that a "Go" indication is continuously given, active operation can be carried out as a matter of course.

The overall judging circuit 70 is intended to conduct the overall judgement. However, in some cases, it is desirable to know the respective characteristics of the overall evaluation for the variable factors and the numerical factors, depending upon the conditions, in that case, the output from the grand adding circuits 29 and 69 are utilized as they are.

Figure 4:
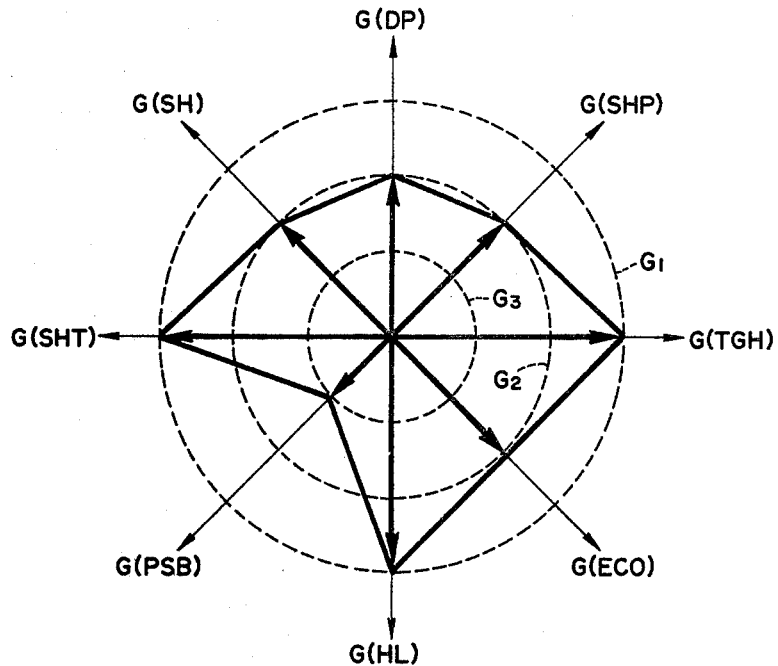
FIG. 4 and 5 illustrate a spider-web display of the indicating factors.
Figure 5:
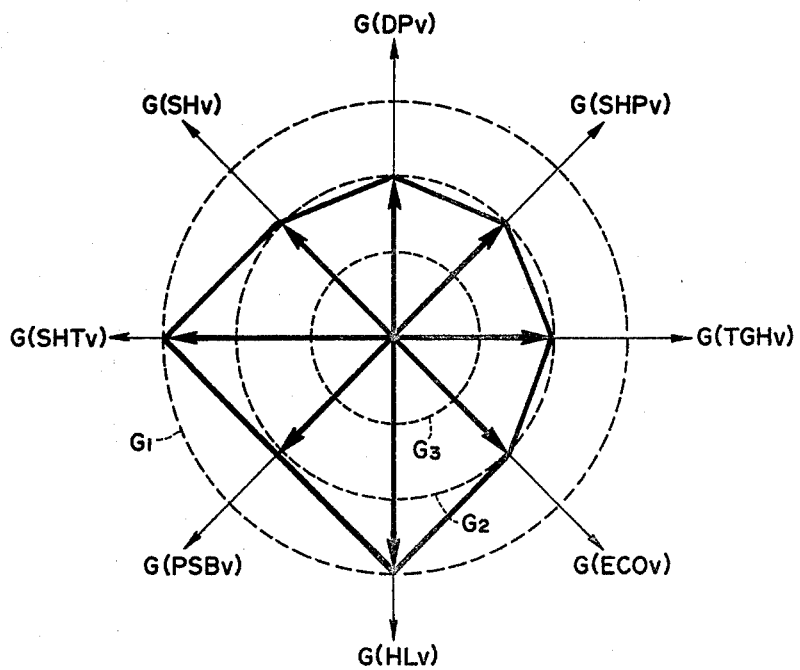

Next, in some cses it is desirable to observe the condition of the numerical factors and the variable factors. The best way to grasp the condition of the factors is to display the numerical and variable factors on a display apparatus such as a cathode ray tube (CRT) or the like. In the drawing, designated at 71 is a display apparatus of the CRT type. Supplied to such a display apparatus are the eight numerical factors and the eight variable factors. In the drawing, all of the factors are supplied in a parallel manner. However, this is a simulating example and the data supplied to the CRT is normally made in a serial manner. Examples of the display on the CRT are shown in FIGS. 4 and 5. FIG. 4 shows an example of the indication of the numerical factors by a "spider-web" type display, i.e., circle and cross. FIG. 5 shows an example of an indication of the variable factors by the "spider-web" type display, i.e., circle and cross. In the drawing $G_1$, $G_2$ and $G_3$ indicate "good," "worse" and "bad," respectively. In the drawing the thick-lined arrow marks indicate the actual magnitude of the factors. According to the indicating method described above, it is readily apparent what is the condition of the eight factors. In addition to this indicator method, there is also a method of trend indication.

FIG. 6 is an example where the judgement values of the numerical factors and the variable factors at regular intervals of 30 minutes and the values of the overall furnace condition indices at regular intervals of thirty minutes during four hours are trend indicated, with the result of the judgement on the overall furnace condition being given as a "go" sign, at the bottom.

According to the present invention as described above, it is now possible to obtain dynamic evaluations and process it for the furnace condition by grasping the eight factors as numerical factors as well as variable factors by conducting an evaluation of the respective numerical and variable factors and further conducting an overall evaluation.

Additionally, the present invention can be embodied by special purpose computers. Furthermore, it should be apparent that whatever stage the evaluation is being made at, the evaluation is made on the basis of 100 points. For this purpose, it is preferable to give the weight allocations on a scale of 100 points.

Figure 7:
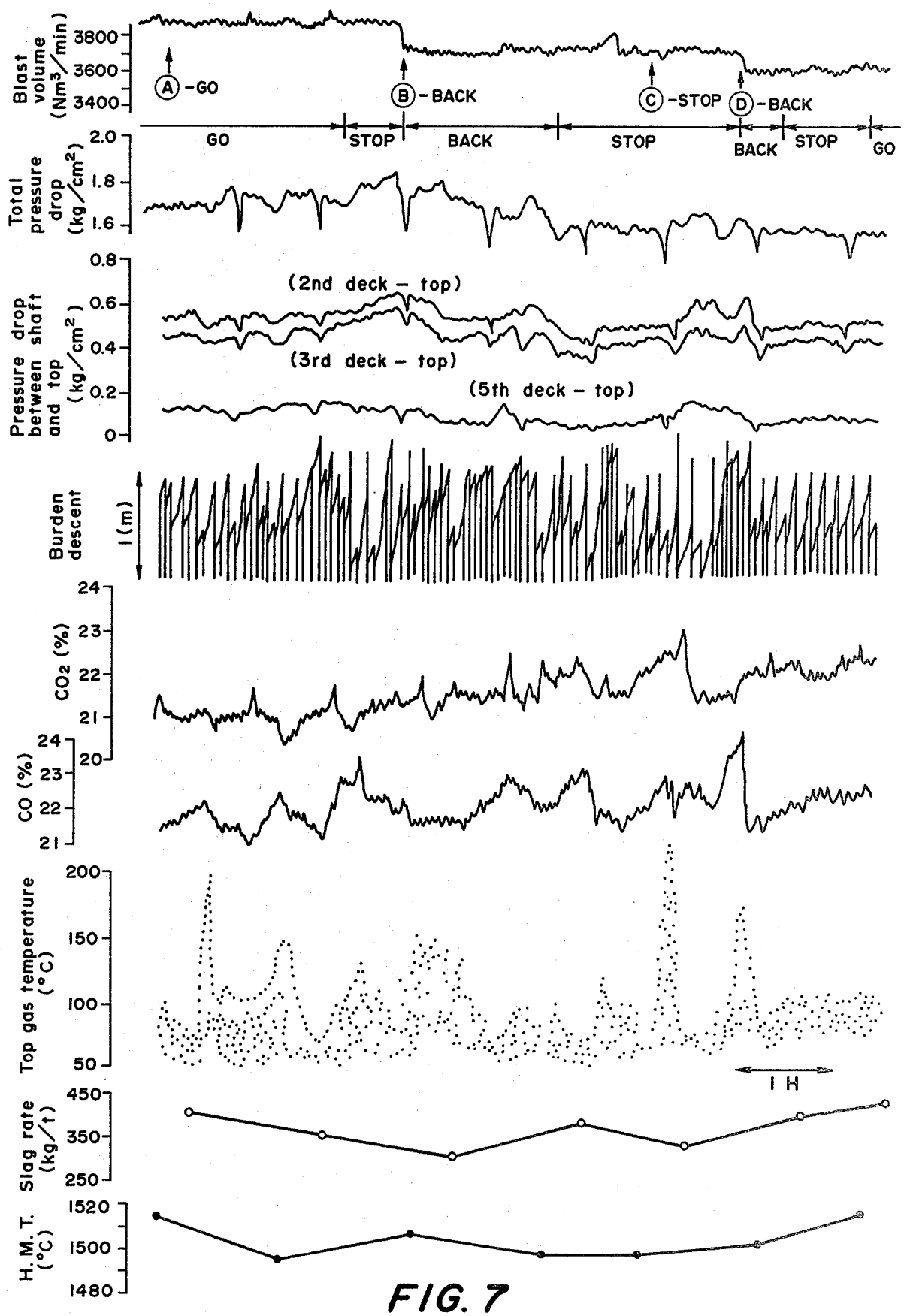
FIG. 7 illustrates the operating conditions of a blast furnace controlled by the system of the present invention.

FIG. 7 shows an example where the furnace operation is carried out according to the present application as described above. In FIG. 7 the various furnace indicative factors are indicated. At the top of the drawing there are illustrated the change in the blast volume which is the controllable factor in the lapse of time, the result of the judgement on the overall furnace condition, i.e., "good," "bad" and "worse" and the actions taken at point A, B, C and D are based on the results of such judgement.

Since the condition of the blast furnace is complicated and means for directly detecting the furnace condition is lacking, it is necessary for blast furnace operators to estimate the furnace condition from a multitude of data, requiring experience and skill. However, the abilities and experience of the individual blast furnace operators is reflected in the results of the judgement of the furnace condition and there have been generally seen differences in the skull of an operator in grasping the furnace condition since there are so many furnace condition factors and the types of changes which occur in the furnace are complicated. Even if variations in the furnace condition are observed, it has been difficult to effect an optimum control of action values for the stabilized operation of the furnace condition quantitatively for the reason that: variations in the disturbance factors in most cases are unpredictable; the magnitude of the variations cannot be quantitatively grasped; and the influences of the variations on the furnace condition are complicated with the influences of the other disturbances thereon. The present invention provides a method wherein the control described above can be affected quantatitively and the action values reliably and quickly given.

It should be apparent to those skilled in the art that the above-described embodiment represents but one of the many possible specific embodiments of the present invention. Numerous and varied other embodiments can be devised by those skilled in the art without departing from the spirit and scope of the present invention.

I claim:

1. A method of operating a blast furnace characterized in that said method comprises the steps of:

detecting from a blast furnace as sample data factors comprising total pressure drop, pressure drop between shaft and furnace top, burden descent, top gas utilization, top gas temperature, shaft wall temperature, thermal state in furnace and input and output balance of iron and slag;

determining from said sample data variable factors corresponding to each of said detective factors;

comparing said sample data for each factor with predetermined limiting values corresponding to the respective factors;

generating a numerical non-dimensional output for each comparison corresponding to the level of satisfaction between the respective sample data and the respective predetermined limiting values;

multiplying the numerical non-dimensional output for each comparison by predetermined weight allocations and generating an output corresponding to the numerical non-dimensional values multiplied by the predetermined weight allocations for each of the numerical non-dimensional outputs;

summing the outputs as a result of the multiplication and generating a numerical factor grand addition output corresponding to the summation of said outputs as a result of said multiplication;

comparing said variable factors with variable factor limiting values corresponding to each of said variable factors;

generating a variable factor numerical non-dimensional output for each comparison corresponding to the level of satisfaction between the variable factors and the corresponding predetermined limiting value;

multiplying each of the variable factor numerical non-dimensional outputs by a predetermined weight allocation;

multiplying each of the variable factor numerical non-dimensional outputs by a predetermined weight allocation;

summing each of the variable factors numerical non-dimensional outputs which have been multiplied by a corresponding predetermined weight allocation to form a variable factor grand addition output;

summing both the numerical factor grand addition output and the variable factor grand addition output to form an overall grand addition output indicative of the operation of the blast furnace; and taking appropriate action to control the operating condition of the blast furnace based on the value of the overall grand addition, numerical factor grand addition, variable factors grand addition and the numerical non-dimensional outputs as a result of the comparisons for both the sample data and the variable factors.

2. A method according to claim 1 wherein each of the sample data is compared with predetermined limiting values in a comparitor.

3. A method according to claim 1 wherein there are three numerical non-dimensional values corresponding to levels of satisfaction.

4. A method according to claim 3 wherein the three levels of satisfaction are "good," "worse" and "bad."

5. A method according to claim 2 wherein said predetermined weight allocations are stored in a weight allocation index generator.

* * * * *